United States Patent
Zaboli

(10) Patent No.: US 6,197,354 B1
(45) Date of Patent: Mar. 6, 2001

(54) METHOD FOR MAKING IMPROVED GARLIC PRODUCT

(76) Inventor: Tony S. Zaboli, 1875 Day Ron Trace, Marietta, GA (US) 30062

( * ) Notice: Subject to any disclaimer, the term of this patent is extended or adjusted under 35 U.S.C. 154(b) by 0 days.

(21) Appl. No.: 09/318,581

(22) Filed: May 25, 1999

(51) Int. Cl.[7] .............................. A23L 1/212; A23L 1/221
(52) U.S. Cl. ............................................. 426/241; 426/632
(58) Field of Search ..................................... 426/241, 632

(56) References Cited

U.S. PATENT DOCUMENTS

| | | | |
|---|---|---|---|
| 3,424,593 | * | 1/1969 | Bockman et al. ...................... 99/154 |
| 4,022,923 | * | 5/1977 | Berger ................................. 426/638 |
| 5,338,557 | * | 8/1994 | Paré .................................... 426/241 |
| 5,458,897 | * | 10/1995 | Paré .................................... 426/241 |
| 5,884,417 | * | 3/1999 | Paré ..................................... 34/263 |

FOREIGN PATENT DOCUMENTS

| | | | |
|---|---|---|---|
| 3525251 | * | 2/1986 | (DE) . |
| 7-16072 | * | 1/1995 | (JP) . |
| 8-298955 | * | 4/1995 | (JP) . |
| 8-298955 | * | 11/1996 | (JP) . |

* cited by examiner

*Primary Examiner*—Nina Bhat
(74) *Attorney, Agent, or Firm*—William A. Marvin

(57) ABSTRACT

A method for processing fresh garlic which will not leave an unpleasant odor after having been digested is disclosed. The fresh garlic can be peeled, unpeeled, minced or chopped prior to processing. Garlic is composed of many tiny micrograins containing aromatic oils that are responsible for its strong odor. It has been determined with the correct processing of the fresh garlic by microwaving an aqueous or water soluble solution of fresh garlic, that most if not all of the tiny micrograms can be ruptured such that the aromatic oils can be easily neutralized by digestion. Solutions that are useful in practicing the invention are pure boiled water, boiled water and vinegar, boiled water and lemon juice, and lemon juice in natural concentration. The microwave radiation is useful in rupturing the micrograins without a total cooking of the garlic which would remove its fresh flavor and texture. In addition, edible salts can also be added during the process to adjust taste or as a preservative.

9 Claims, No Drawings

METHOD FOR MAKING IMPROVED GARLIC PRODUCT

BACKGROUND OF THE INVENTION

1. Field of the Invention

The present invention generally relates to a method for processing fresh garlic to render it odorless after consumption and to provide for its long term preservation, and more particularly, to a process which uses a rapid internal thermal energy build up, such as microwave energy, to rupture the microcapsules of aromatic oils contained within cloves of garlic without cooking the clove or varying its freshness and texture substantially.

2. Description of Background Art

Garlic has been used for food for a long time for the purposes of nutrition, medical use, flavoring, etc. However, the range of its utilization for food has been somewhat limited because of its strong odor and such odor's lasting effects on those who consume the garlic. Various methods are listed in the art to remove odor from garlic.

In general, some of the attempts and methods can be characterized in different groups. One group acts by removing garlic odor constituents by treatment using enzymes or agents. This can be accomplished with a fermentation product as per JP 2894/1960; JP 14,392/1963; and JP 27,308/1967; treatment using agents such as pyroligneous acid as per JP 19,936/1975; an aqueous solution of acetic acid as per JP 130,455/1978; phytic acid and silic acid sol as per JP 29,265/1982; and a menthol containing solution as per JP 13,964/1989, etc. Another group acts by forcibly removing garlic odor constituents by treating garlic water extract with resins, active carbon or steam as per JP 210,864/1984 and JP 100,259/1987, including extraction with alcohol and the like, etc. Still another group comprises deodorizing garlic by inactivating allinase, an enzyme involved in the formation of garlic odor, by heat inactivating the enzyme with a hot blast of gas as per JP 77,560/1975; steam cooking as per JP 198,065/1982; boiling as per JP 115,947/1967 and JP 12,658/1966; treatment using oil at a high temperature as per JP 28,658/1973; baking as per JP 265,862/1989; and electromagnetic wave heating as per JP 18,568/1973, JP 48,862/1974 and JP 64,762/1981, etc.

SUMMARY OF THE INVENTION

The invention pertains to a process to render garlic nonoffensive after it has been eaten. Garlic is composed of many tiny micrograins or capsules containing the aromatic oils causing such odors. Presently, the odors are produced by garlic, even after cooking and eating, because all of the tiny micrograms of garlic have not been ruptured and thus do not allow neutralization of the oils either by cooking and/or digestion.

The process includes the rapid internal heating of the microcapsules of the garlic cloves until they burst. The process causes the rupture of all of the micrograins by a preprocessing step accomplished by microwaving peeled cloves of fresh garlic in a liquid. The garlic cloves are microwaved until all of the micrograms have burst but not to the extent they are cooked and changed in texture or that the aromatic oils are lost.

The liquid can be any of the group of water, any soluble oil, lemon juice or vinegar. Any type of consumable salt can also be added to the liquid prior to or after microwaving for adjusting the taste or as a preservative. The microwaving or rapid thermal heating is believed to internally burst the micrograms by the rapid expansion of the oils and other liquids from the inside thereby allowing their rapid digestion and no lingering odors.

Alternatively, a processing liquid can be added to fresh garlic cloves for a specific period of time before processing such that it may be absorbed in the garlic cloves to a desired extent.

Alternatively, the processing liquid can be poured off and new or different liquids form the group of water, soluble oil, lemon juice or vinegar used to replace the processing liquid as a storage liquid.

Alternatively, the fresh garlic cloves can be minced or chopped prior to or after processing.

The garlic processed by this method is best used the same way fresh garlic is used. Processed in a liquid and salted the fresh garlic exhibits extended shelf life.

These and other objects, aspects and features of the invention will be more clearly understood and better described when the following detailed description is read.

DETAILED DESCRIPTION OF A PREFERRED EMBODIMENT

In general the process of the invention includes the steps of providing fresh garlic in bulbs or other similar forms having a plurality of cloves containing a multitude of micrograins enclosing the aromatic oils of the garlic, rapidly heating the micrograms from the inside by the absorption of thermal energy from a source until they burst, and discontinuing the thermal energy from the source immediately after the micrograms burst so as to preserve the freshness and texture of the garlic. The source of the thermal energy is preferably a microwave energy source, such a conventional microwave oven that heats by absorption of the microwave radiation from the inside out. This type of source is easy to control and can be turned off quickly once the micrograins have burst so that no unnecessary additional cooking takes place. The invention uses the microwave energy to quickly burst the micrograins by expanding moisture in them until they open releasing the aromatic oils but in controllable amounts so that the garlic does not cook or lose its fresh texture. To this end, several samples were prepared by the inventive process:

EXAMPLE 1

Fresh garlic was peeled and 235 gr. of the cloves were immersed (covered) in 210 gr. of boiled water in a glass jar;

The glass jar was inserted into a conventional microwave oven (General Electric, Dual Wave Model);

The power setting was set to Power 10 and cycled for four minutes;

The contents were thereafter stirred to remove bubbles form the jar;

The power setting was set to Power 10 and cycled for one minute thirty seconds;

The contents were thereafter stirred to remove bubbles from the jar where the water had started foaming;

The Jar was removed from the Microwave and cooled in an ice bath for five minutes;

The glass jar was inserted back into the microwave oven;

The power setting was set to Power 10 and cycled for two minutes while observing no bubbles;

The power setting was set to Power 10 and cycled twice for thirty seconds while observing bubbles;

The power setting was set to Power 10 and cycled for one minute and twenty seconds.

Result: The garlic is too cooked, the heating of the water to its boiling point as evidenced by the bubbles caused the product to absorb heat from the liquid.

EXAMPLE 2

Fresh garlic was peeled and 235 gr. of the cloves were immersed (covered) in 210 gr. of 5% vinegar in a glass jar;

The glass jar was inserted into a conventional microwave oven (General Electric, Dual Wave Model);

The power setting was set to Power 10 and cycled for four minutes;

The contents were thereafter stirred to remove bubbles from the jar;

The power setting was set to Power 10 and cycled for one minute, no bubbles were observed.

Result: Acceptable, but texture is not as hard as desired.

EXAMPLE 3

Fresh garlic was peeled and 235 gr. of the cloves were immersed (covered) in 210 gr. of lemon juice in natural concentration in a glass jar;

The glass jar was inserted into a conventional microwave oven (General Electric, Dual Wave Model);

The power setting was set to Power 10 and cycled for four minutes;

The contents were thereafter stirred to remove bubbles from the jar.

Result: Acceptable, but texture is not as hard as desired. Some sedimentation is observed. The smell of garlic is less.

EXAMPLE 4

Fresh garlic was peeled and 235 gr. of the cloves were immersed (covered) in 210 gr. of lemon juice in natural concentration in a glass jar;

The glass jar was inserted into a conventional microwave oven (General Electric, Dual Wave Model); and The power setting was set to Power 10 and cycled for three minutes.

Result: Acceptable. Some sedimentation still observed.

EXAMPLE 5

Fresh garlic was peeled and 235 gr. of the cloves were immersed (covered) in 210 gr. of a mixture of 50% lemon juice in natural concentration, 50% boiled water and one tbs. honey in a glass jar;

The glass jar was inserted into a conventional microwave oven (General Electric, Dual Wave Model); and The power setting was set to Power 10 and cycled for three minutes.

Result: Acceptable, the smell of garlic is less.

EXAMPLE 6

Fresh garlic was peeled and 235 gr. of the cloves were immersed (covered) in 210 gr. of a 40% ethanol solution in a glass jar;

The glass jar was inserted into a conventional microwave oven (General Electric, Dual Wave Model);

The power setting was set to Power 10 and cycled for three minutes;

Result: Acceptable.

Conclusion: Due to the nature of microwave radition, all water soluble fluids will produce similar results when processing garlic.

While the invention has been described in connection with its preferred embodiments, this specification is not intended to limit the scope of the invention to the particular forms set forth, but, on the contrary, it is intended to cover any such alternatives, modifications, and equivalents as may be included within the spirit and scope of the invention as defined by the appended claims.

What is claimed is:

1. A method of processing fresh garlic to make it more digestible and thereby reduce any lingering characteristic odor after it has been ingested, comprising the steps of:
    providing fresh garlic in bulbs having a plurality of cloves containing a multitude of micrograins enclosing the aromatic oils of the garlic;
    breaking and separating the bulbs into cloves;
    peeling the cloves;
    placing the peeled cloves into a processing liquid selected from the group consisiting of water, any edible oil, lemon juice or vinegar;
    rapidly heating the micrograins from the inside by the absorption of thermal energy from a microwave radiation source until they burst;
    discontinuing the thermal energy from the source immediately after the micrograins burst so as to preserve the freshness, flavor, aroma and texture of the garlic.

2. A method of processing fresh garlic to make it more digestible and thereby reduce any lingering characteristic odor as set forth in claim 1 wherein;
    the processing liquid is replaced immediately after the step of heating by a liquid of the group consisting of water, any edible oil, lemon juice or vinegar.

3. A method of processing fresh garlic to make it more digestible and thereby reduce any lingering characteristic odor as set forth in claim 1 wherein;
    the processing liquid is replaced after a predetermined period of time after the step of heating by a liquid of the group consisting of water, any edible oil, lemon juice or vinegar.

4. A method of processing fresh garlic to make it more digestible and thereby reduce any lingering characteristic odor as set forth in claim 1 wherein;
    the step of heating is done immediately alter the placement of the fresh garlic in the processing liquid.

5. A method of processing fresh garlic to make it more digestible and thereby reduce any lingering characteristic odor as set forth in claim 1 wherein;
    the step of heating is done a predetermined period of time after the placement of the fresh garlic in the processing liquid.

6. A method of processing fresh garlic to make it more digestible and thereby reduce any lingering characteristic odor as set forth in claim 1 wherein the process further includes the step of:
    adding a preservative to the processing liquid.

7. A method of processing fresh garlic to make it more digestible and thereby reduce any lingering characteristic odor as set forth in claim 6 wherein:
    the preservative is an edible salt.

8. A method of processing fresh garlic to make it more digestible and thereby reduce any lingering characteristic odor as set forth in claim 1 wherein the process further includes the step of:
    adding a flavoring to the processing liquid.

9. A method of processing fresh garlic to make it more digestible and thereby reduce any lingering characteristic odor as set forth in claim 8 wherein:
    the flavoring is an edible salt.

* * * * *